US010764046B2

(12) United States Patent
Walrant

(10) Patent No.: US 10,764,046 B2
(45) Date of Patent: Sep. 1, 2020

(54) UPDATING AND DISTRIBUTING SECRET KEYS IN A DISTRIBUTED NETWORK

(71) Applicant: NXP B.V.

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 339 days.

(21) Appl. No.: 15/839,667

(22) Filed: Dec. 12, 2017

(65) Prior Publication Data

US 2018/0167212 A1   Jun. 14, 2018

(30) Foreign Application Priority Data

Dec. 13, 2016 (EP) .................................. 16203906

(51) Int. Cl.
*H04L 9/08* (2006.01)
*H04L 9/32* (2006.01)
(Continued)

(52) U.S. Cl.
CPC .......... *H04L 9/0891* (2013.01); *H04L 9/0833* (2013.01); *H04L 9/0861* (2013.01);
(Continued)

(58) Field of Classification Search
CPC ... H04L 9/0891; H04L 9/3213; H04L 9/0861; H04L 9/0833; H04L 9/321; H04L 9/3247;
(Continued)

(56) References Cited

U.S. PATENT DOCUMENTS 8,028,171 B2   9/2011   Teranishi
8,302,176 B2   10/2012  Huang
(Continued)

FOREIGN PATENT DOCUMENTS

CN   101517598 B   8/2009
CN   101616165 A   12/2009
(Continued)

OTHER PUBLICATIONS

Sharma, S. et al. "An Efficient Distributed Group Key Management Using Hierarchical Approach with Elliptic Curve Cryptography", IEEE International Conference on Computational Intelligence & Communication Technology, Ghaziabad, pp. 687-693 (2015).
(Continued)

*Primary Examiner* — Kambiz Zand
*Assistant Examiner* — Benjamin A Kaplan
(74) *Attorney, Agent, or Firm* — Rajeev Madnawat

(57) ABSTRACT

A network node and a method of updating and distributing secret keys in a distributed network is suggested. The network comprises a plurality of nodes connected to a shared medium of the distributed network. Each node of the plurality of nodes is member of at least one group of a plurality of groups. Each group is associated with a secret group key. Each node of the plurality of nodes stores only the one or more secret group keys, of which it is member. A first node of the plurality of nodes generates an authenticated update key request. The authenticated update key request comprises an indication of a membership, of which the first node is member. The first node broadcasts the authenticated update key request on the shared medium of the distributed network. Each remaining nodes of the plurality of nodes receives the authenticated key update.

13 Claims, 5 Drawing Sheets

(51) Int. Cl.
*H04L 29/06* (2006.01)
*H04W 12/06* (2009.01)
*H04W 12/12* (2009.01)
*H04L 12/40* (2006.01)
*H04L 9/30* (2006.01)

(52) U.S. Cl.
CPC ............ *H04L 9/321* (2013.01); *H04L 9/3213* (2013.01); *H04L 9/3247* (2013.01); *H04L 63/065* (2013.01); *H04L 63/0823* (2013.01); *H04L 63/0869* (2013.01); *H04L 63/0876* (2013.01); *H04L 63/0884* (2013.01); *H04L 63/101* (2013.01); *H04L 63/12* (2013.01); *H04L 63/126* (2013.01); *H04W 12/06* (2013.01); *H04W 12/12* (2013.01); *H04L 9/30* (2013.01); *H04L 2012/40215* (2013.01)

(58) Field of Classification Search
CPC ... H04L 9/30; H04L 63/0823; H04L 63/0884; H04L 63/0876; H04L 63/101; H04L 63/12; H04L 63/065; H04L 63/0869; H04L 63/126; H04L 2012/40215; H04W 12/06; H04W 12/12
USPC ........................................................ 713/176
See application file for complete search history.

(56) References Cited

U.S. PATENT DOCUMENTS

| | | | |
|---|---|---|---|
| 8,391,492 | B1 | 3/2013 | Le Faucheur et al. |
| 9,231,936 | B1 | 1/2016 | Wang et al. |
| 9,853,964 | B2 | 12/2017 | Chester |
| 2003/0163727 | A1 | 8/2003 | Hammons et al. |
| 2005/0097317 | A1* | 5/2005 | Trostle ................. H04L 9/0833 713/163 |
| 2009/0119657 | A1 | 5/2009 | Link, II |
| 2009/0254750 | A1 | 10/2009 | Bono et al. |
| 2011/0087882 | A1 | 4/2011 | Kuo et al. |
| 2011/0183748 | A1 | 7/2011 | Wilson et al. |
| 2011/0258454 | A1 | 10/2011 | Qiu et al. |
| 2013/0067220 | A1 | 3/2013 | Ando et al. |
| 2013/0227658 | A1* | 8/2013 | Leicher ............... H04L 63/0876 726/5 |
| 2015/0089236 | A1 | 3/2015 | Han et al. |
| 2016/0149908 | A1 | 5/2016 | Unagami et al. |
| 2016/0285863 | A1 | 9/2016 | Canavor et al. |
| 2016/0294605 | A1 | 10/2016 | Searle et al. |
| 2017/0250816 | A1* | 8/2017 | Popa ..................... H04L 9/3247 |
| 2018/0167216 | A1 | 6/2018 | Walrant |
| 2018/0167218 | A1 | 6/2018 | Walrant |

FOREIGN PATENT DOCUMENTS

| | | |
|---|---|---|
| CN | 101807818 B | 8/2010 |
| DE | 10 2007 036 094 A1 | 2/2009 |
| DE | 10 2012 219 079 A1 | 4/2014 |
| EP | 3 038 318 A1 | 6/2016 |
| WO | 2015125197 A1 | 8/2015 |

OTHER PUBLICATIONS

Mortazavi, S. A. et al. "An efficient distributed group key management using hierarchical approach with Diffie-Hellman and Symmetric Algorithm: DHSA", International Symposium on Computer Networks and Distributed Systems (CNDS), Tehran, pp. 49-54. (2011).

Adusumilli, P. et al. "DGKD: distributed group key distribution with authentication capability",Proceedings from the Sixth Annual IEEE SMC Information Assurance Workshop, pp. 286-293 (2005).

Non-Final Rejection for U.S. Appl. No. 15/839,783, 14 pgs., (dated Nov. 4, 2019).

Non-Final Rejection for U.S. Appl. No. 15/839,860, 13 pgs. (dated Nov. 4, 2019).

Groll, A. et al. "Secure and Authentic Communication on Existing In-Vehicle Networks", IEEE Intelligent Vehicles Symposium, pp. 1093-1097 (2009).

Falk, R. et al. Üsing Managed Certificate Whitelisting as a Basis for Internet of Things Security in Industrial Automation Applications, International Journal on Advances in Security, vol. 8, No. 1 & 2, pp. 89-98 (2015).

Notice of Allowance for U.S. Appl. No. 15/839,860, 8 pgs. (Mar. 18, 2020).

Notice of Allowance for U.S. Appl. No. 15/839,783, 7 pgs. (Apr. 8, 2020).

\* cited by examiner

US 10,764,046 B2

UPDATING AND DISTRIBUTING SECRET KEYS IN A DISTRIBUTED NETWORK

CROSS-REFERENCE TO RELATED APPLICATIONS

This application claims the priority under 35 U.S.C. § 119 of European Patent application no. 16203906.9, filed on Dec. 13, 2016, the contents of which are incorporated by reference herein.

FIELD OF THE INVENTION

The present invention relates to distributed network communication technology, and specifically, to confidential key update and diversification methodologies within distributed network communication.

BACKGROUND

In any distributed networks, integrity and/or confidentially of data communication is a core aspect when using such distributed networks in security and/or safety sensitive environments. Integrity of data communication comprises the integrity of the data communicated the communication medium of a distributed network and the integrity of the network devices participating in the data communication. An illegitimate network device may compromise the data communication on the distributed network.

A Fieldbus CAN (Controller Area Network), which is the abbreviation of Controller Area Network, is an example of a typical distributed network, which interconnects several electronic control units (ECUs) via a shared wired communication medium. The fieldbus CAN is typically used for decentralized control functions in safety relevant environments. Compared to other field bus, the fieldbus CAN has a high reliability, low cost and other advantages, so it has been widely used. In particular, CAN bus plays an important role in intelligent control system and provides an open communications platform to allow for real-time exchange of data between the networked units.

The open nature of interconnection to distributed networks such as the fieldbus CAN communication system implies insecurity. Because broadcast packet mode communication, illegal access to the listeners can get the channel data. Moreover in case of open protocol standards, the data can easily be interpreted as meaningful information, illegal networked units can easily intercept bus messages, posing legal unit control, to bring great security risk, which for high safety requirements for intelligent system is unacceptable, and therefore need to consider the integrity and confidentiality of data communications.

SUMMARY

The present invention provides a networked node and a method of updating and distributing keys in a distributed network as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
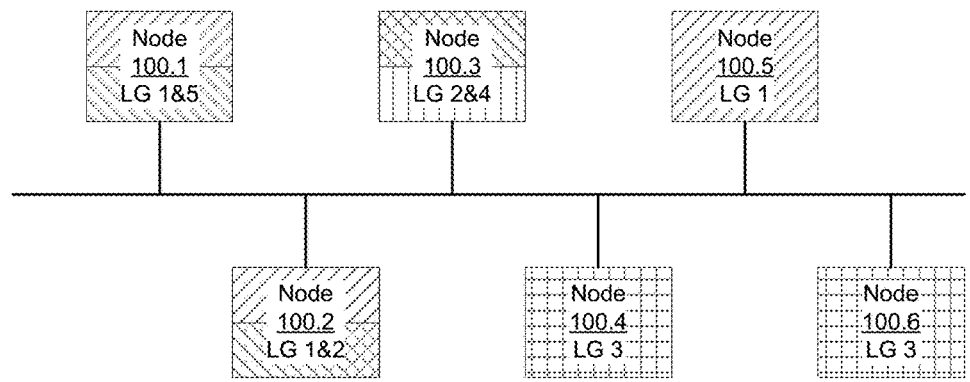
FIG. 1 schematically illustrates a block diagram a CAN bus system comprising a plurality of networked nodes or ECU, electronic control units, capable of exchanging data messages between them using the CAN bus as a shared communication medium according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 shows a block diagram of a CAN bus system comprising a plurality of networked nodes or ECU, electronic control units, capable of exchanging data messages between them using the CAN bus as a shared communication medium. The illustrated CAN bus is an example of a data bus designed to allow microcontrollers and devices to communication with each other without a host controller. The CAN bus is a message-based protocol originally designed for automotive applications, but also used in other areas such as aerospace, maritime, industrial automation, medical equipment, and the like. A typical modern automobile may have as many employ 50 or more electronic control units (ECUs) for various subsystems, including individual control units for the engine, transmission, vehicle telematics, airbags, antilock braking/ABS, cruise control, electric power steering, audio systems, power windows, doors, mirror adjustment, battery systems, etc. Accordingly, a CAN bus may be used in vehicles to connect an engine control unit with a transmission control unit, etc. Those skilled in the art will understand that although the present description will relate to fieldbus CAN network(s) for the sake of explanation, the illustrated fieldbus CAN implementations are for the sake of illustration only. The teaching of the present application is applicable with any distributed network, which interconnects a plurality of networked units via a shared communication medium and in which the integrity and/or confidentiality of the communicated data is a desire and requirement, respectively.

For instance, in order to prevent from false data injection attacks in any systems that may employ a CAN bus the so-called nodes may be grouped into logical groups, each of which is associated with a secret group key. The secret group key is a common secret shared among the nodes, which are assigned to or member of a logical group. The secret group keys may be used to enable an isolation, authentication and/or encryption of the message communication on the CAN bus. Isolation and/or authentication may be obtained in that messages communicated on the CAN bus are associated with message authentication codes (MACs) generated on the basis of secret group keys. Encryption may be obtained in that messages communicated on the CAN bus comprise payload, which is at least partially encrypted on the basis of the secret group keys.

The nodes enabled for communicating on the CAN bus are assigned to one or more logical groups LGs. The nodes, which are member of a logical group, communicate with each other via a logical channel on the CAN bus by using message authentication codes (MAC), which associate data messages to a virtual channel. A message authentication code valid for a logical group can only be successfully generated by a sender node, which knows the secret group key associated with the respective logical group, and a valid message authentication code can only be successfully verified by a receiver node, which knows the secret group key associated with the respective logical group. Hence, an isolation of the data communication on the CAN bus in logical channels of the virtual groups is obtained. Confidentiality of the communication data may be further obtained by encrypting the data payload or a part thereof based on the secret group keys.

As illustratively shown in FIG. 1, each of the nodes 100.1 to 100.6 may be assigned to one or more logical groups, herein the example logical groups LG 1 to LG 3. The logical group LG 1 comprises for instance the nodes 100.1, 100.2, and 100.5; the logical group LG 2 comprises for instance the nodes 100.2 and 100.3 and the logical group LG 3 comprises for instance the nodes 100.4 and 100.6. Each message communication over the CAN bus by one of the nodes is for instance associated with a message authentication code (MAC), which may be part of the message or broadcast in a separate message associated with a respective data message. The MAC is generated on the basis of a secret group key associated with a respective one of the logical groups. For instance, the node 100.1 intends to broadcast a data message to node 100.5. Both are part of the logical group LG 1. The MAC to authenticate that the data message belongs to the logical group LG 1 is generated on the basis of the secret group key $K_{LID}1$, where LID1 abbreviates the term logical group identifier 1 and refers to logical group LG 1. Only a node, which knows the secret group key $K_{LID}1$, is able to verify the MAC. The secret group key $K_{LID}1$ is a common secret shared only among the nodes 100.1, 100.2 and 100.5 being member of the logical group LG 1 such that the exemplary nodes 100.1, 100.2 and 100.5 are enabled to successfully verify the MAC. For instance, nodes, which are not enabled to successfully verify the MAC may discard the data massage. Alternatively, nodes may implement specific data processing to handle message data carried by unsuccessful verified data messages. Thus, a logical separation of the data communication on the shared bus into logical channels of the logical groups is obtained. Data messages without valid MACs may be discarded or handled specifically by the receiver nodes.

In some cases, the sender node may include at least a portion of the contents of the authentication message (e.g., authentication code) in the data message. Message authentication code (MAC) may be implemented for existing applications on top of the CAN protocol. For instance, if there is open space left in the data field of the data message, the sender node may use this space to carry the MAC (e.g. in form of a truncated hash value). If data field is occupied, but the deployed CAN protocol supports the extended identity field, the sender node may use this extended identity field to carry the MAC. If neither of the above methods are possible, but the deployed CAN protocol supports the extend data field (e.g. data segmentation), the sender node may use an extended CAN message to carry the MAC. If none of the above options are available, the sender node may use a separate authentication message to send the MAC. For instance, the sender node may broadcast a data message using an original protocol, and immediately after sending the data message, the sender ECU may broadcast a follow-up authentication message.

It should be noted that the above example of using secret group keys to provide message authentication codes is only one usage example of secret keys shared among groups of nodes. Those skilled in the art will understand from the following description that the purpose and usage strategy of the shared secret keys such as the aforementioned secret group keys is out of the scope of the present application. For the sake of a more fully understanding it should be assumed that the keys are secret keys, which are shared among nodes sorted by groups for a given purpose. The group membership should be understood as part of the bus security architecture and is predefined for each node. However, it is immediately understood that the confidentiality of shared secret keys is a general crucial aspect in view of security. According to the present disclosure, the confidentiality of the secret group keys is ensured in that the secret group keys are communicated only among trusted nodes. The methodology will be more fully described in the following.

Figure 2:
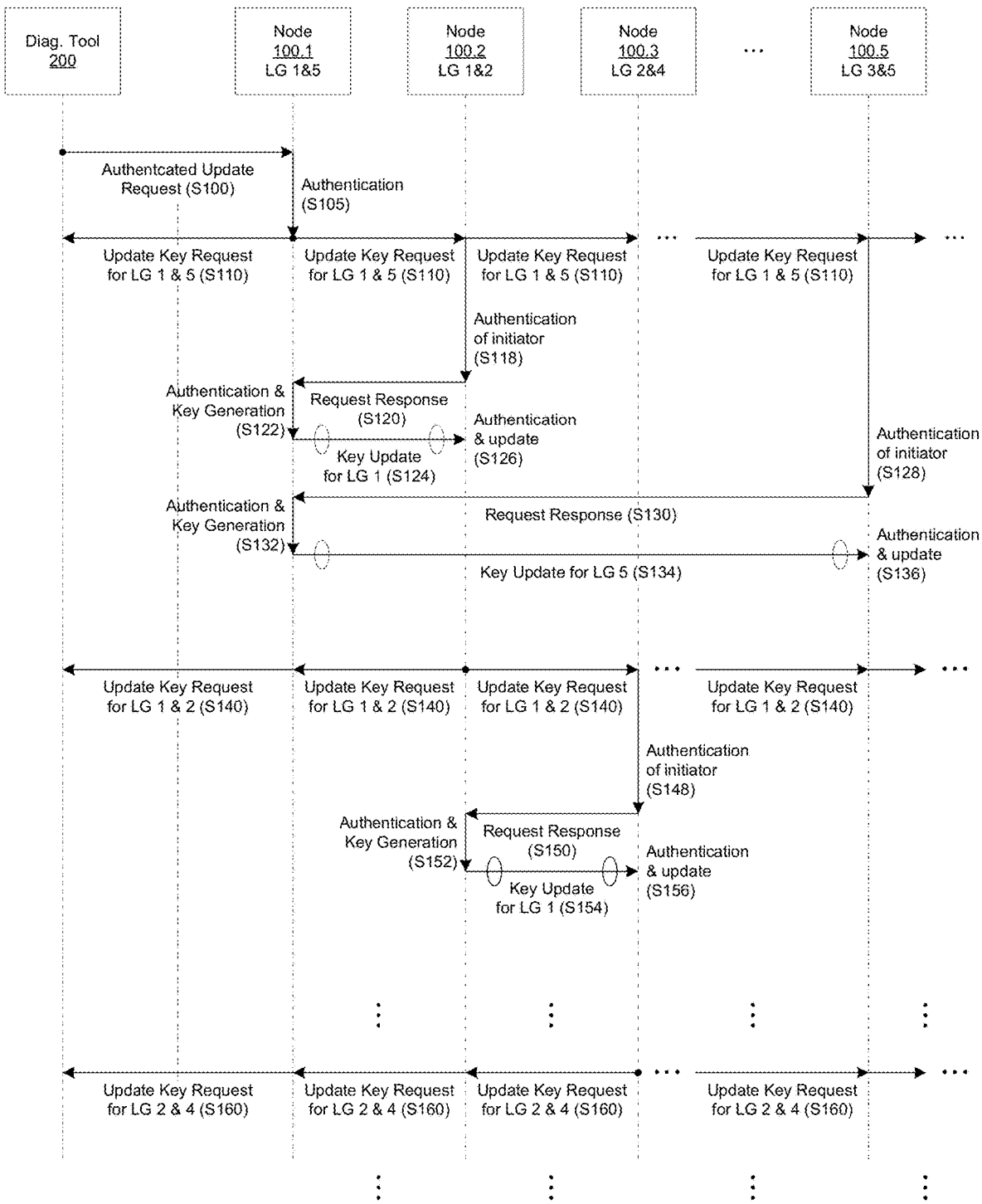
FIG. 2 schematically illustrates a flow diagram relating to a key update and distribution procedure for nodes connected to a shared bus according to an example of the present invention.

Referring now to FIG. 2, a flow diagram relating to a key update and distribution procedure according to an embodiment of the present application is schematically illustrated.

A shared bus comprises a plurality of nodes including the exemplary nodes 100.1 to 100.5. The nodes are enabled to communicate data messages over the shared bus. It should be noted that the shared bus may be a CAN bus referred to with respect to FIG. 1. Those skilled in the art will understand that the described key update and distribution procedure is implementable on any shared bus, which includes in particular any fieldbus.

The nodes may be members of one or more logical groups. For the sake of illustration, the node 100.1 is for instance assigned to the logical groups LG 1 and LG 5, the node 100.2 is assigned to the logical groups LG 1 and LG 2, the node 100.3 is assigned to the logical groups LG 2 and LG 4 and the node 100.5 is assigned to the logical groups LG 3 and LG 5. For instance for the sake of integrity of the data communication on the shared bus, the node 100.1 makes use of one of the secret group keys $K_{LID}1$ and $K_{LID}5$ associated with the logical groups LG 1 and LG 5, the node 100.2 makes use of one of the secret group keys $K_{LID}1$ and $K_{LID}2$ associated with the logical groups LG 1 and LG 2, respectively, the node 100.3 makes use of one of the secret group keys $K_{LID}1$ and $K_{LID}2$ associated with the logical groups LG 2 and LG 4, respectively, and the node 100.5 makes use of one of the secret group keys $K_{LID}3$ and $K_{LID}5$ associated with the logical groups LG 3 and LG 5, respectively.

The key update and distribution procedure is triggered by an initiator node 200, which may by an external node temporarily connected to the shared bus. For instance, the CAN bus is one of five protocols used in the on-board diagnostics (OBD) II vehicle diagnostics standard. The OBD-II has been mandatory for all cars and light trucks sold ibn the United States since 1996 and the EOBD standard has been mandatory for all gasoline powered vehicles sold in the European Union since 2001 and all diesel powered vehicles since 2004. An external node temporarily connected to the CAN bus may by a diagnostic tool connected to the on-board diagnostics interface.

In some cases, initiator node 200 may connect to shared bus via a network. Examples of such a network include any combination of control area networks (CAN), local area networks (LAN), wide area networks (WAN), virtual private networks (VPN), wireless networks (using 802.11, for example), cloud networks, cellular networks (using 3G and/or LTE, for example), and the like. In some configurations, the network may include the Internet. Thus, the network may include one or more gateway devices, access points, routers, switches, dynamic host configuration protocol (DHCP) servers, and the like, which enable computing devices to connect to the Internet.

The initiator node 200 generates and sends a trigger request on the shared bus in an operation S100. The trigger request addresses one of the nodes connected to the shared bus, which becomes first master node for the key update and distribution procedure. Any node may acquire the role of a master node. Herein, the update trigger request is addressed to the node 100.1. The trigger request is provided to initiate the key update and distribution procedure of the nodes connected to the shared bus. The trigger request initiates the key update and distribution procedure involving the nodes connected to the shared bus and in particular trigger request initiates the key update and distribution procedure involving the nodes, which are member of one or more logical groups. Nodes not being member of a logical group may be connected to the shared bus but may not participate in the key update and distribution procedure.

The key update and distribution procedure relates to the generation and distribution of secret group keys among the nodes being member of the respective logical groups. Each secret group key is generated by one of the nodes being member of a respective logical group (with which the generated secret group key is associated) and further distributed among the other remaining nodes being member of the same respective logical group. From the following description, those skilled in the art will understand that the key update and distribution procedure is performed by the nodes in form of a cascaded procedure.

The trigger request comprises initiator authenticity related information, which enables the master node 100.1 to authenticate the initiator node 200. The initiator authenticity related information may comprise a public key and a signature generated by the interior node 200 using a paired private key. The signature is generated from a predefined sequence including among others a timestamp of the interior node 200.

On receiving the trigger request, the master node 100.1 authenticates the initiator node 200. The authentication verification (e.g. operation S105) includes authentication of the identity of the initiator node 200 and/or the verification of the permission of the initiator node 200 to initiate the key update and distribution procedure. In an example, the initiator node 200 authenticates itself by an identity certificate and the initiator generated signature comprised by the initiator authenticity related information in the trigger request. The identity certificate of the initiator node 200 may be signed by a certificate authority CA and includes the permission to initiate the key update and distribution procedure.

On successfully authentication of the initiator node 200 by the master node 100.1, the master node 100.1 broadcasts in an operation S110 an update key request on the shared bus, which comprises the initiator authenticity related information and an indication of the membership of the master node 100.1. The indication of the membership indicates the one or more logical groups, of which the master node 100.1 is member. With regard to the example shown in FIG. 2, master node 100.1 is for instance member of the logical groups LG 1 and LG 5. Accordingly, the update key request broadcast by the master node 100.1 on the shared bus discloses to all connected nodes the membership of the master node 100.1

In an example, the update key request comprises an identity certificate of the master node 100.1. The identity certificate of the master node 100.1 is signed by the certificate authority CA and may include the indication of the membership of the master node 100.1.

The nodes connected to the shared bus receiving the update key request verify the authentication of the initiator node 200 and check whether or not the indication of membership comprised in update key request at least partially matches their own memberships. The membership at least partially matches for those nodes, which are also member of one or more of the logical groups indicated in the update key request. Herein, a partial match of the memberships is for instance detected by the node 100.2, which is among others member of the logical group LG 1, and by the node 100.5, which is among others member of the logical group LG 5. Remember that master node 100.1 is member of the logical groups LG 1 and LG 5 for the sake of illustration.

Each update key request receiver node, which is member of at least one logical group matching with one of the logical groups indicated in the membership comprised in the update key request of the master node 100.1 responses with a update key request respond.

The update key request respond comprises node authenticity related information of the receiver node 100.2, which enables the master node 100.1 to authenticate the receiver node 100.2. The node authenticity related information may comprise a public key and a signature generated by the receiver node using a paired private key. The signature is generated from a predefined sequence including among others the timestamp.

For instance, receiver node 100.2, which is member of the logical group LG 1 like the master node 100.1, sends in an operation S120 an update key request response back to the master mode 100.1. On receiving the update key request response, the master node 100.1 authenticates the receiver node 100.2, in an operation S122. The authentication verification includes authentication of the identity of the receiver node 100.2. In an example, the receiver node 100.2 authenticates itself by an identity certificate and the receiver node generated signature comprised by the node authenticity related information. The identity certificate of the receiver node 100.2 may be signed by the certificate authority CA and may include the indication of the membership of the receiver node 100.2. The node authenticity related information of the receiver node 100.2 enables any other node to verify the authenticity of the receiver node 100.2.

In response to a successful authentication, the master node 100.1 generates one or more secret group keys, which are associated with the one or more matching logical groups. The master node 100.1 updates its local key storage with the one or more newly generated secret group keys. In accordance with the exemplary assignment of nodes to the logical groups herein, the secret group key $K_{LID}1$ is generated and updated in the local key storage of the mater node 100.1.

In an operation S124, the one or more secret group keys associated with the matching logical groups are send by the master node 100.1 in a key update response to the request responding node 100.2. The key update response is send via a secure channel established between the master node 100.1 and the receiver node 100.2 on the shared bus such that the receiver node 100.2 is the only node, which is enabled to obtain the one or more sent secret group keys generated by the node 100.1.

The update key request respond comprises node authenticity related information of master node 100.1, which enables the receiver node 100.2 to authenticate receiver the master node 100.1. The node authenticity related information may comprise a signature generated by the master node 100.1 using a paired private key. The signature is generated from a predefined sequence including among others the timestamp.

Herein, the receiver node 100.2 receives the secret group key $K_{LID}1$ according to the membership matching and is enabled to update its local key storage with the secret group key $K_{LID}1$ for future use in response to a successful authentication of the master node 100.1 on the basis of the node authenticity related information comprised in the received update key response in an operation S126. Hence, the master node 100.1 and the receiver node 100.2 are now in possession of the same secret group key $K_{LID}1$ associated with the logical group LG 1.

For instance, receiver node 100.5, which is member of the logical group LG 5 like the master node 100.1, sends in a following operation S130 an update key request response back to the master mode 100.1. On receiving the update key request response, the master node 100.1 authenticates the receiver node 100.5, in an operation S132. The authentication verification includes authentication of the identity of the receiver node 100.5. In an example, the receiver node 100.5 authenticates itself by an identity certificate and the receiver node generated signature comprised by the node authenticity related information in the trigger request. The identity certificate of the receiver node 100.5 may be signed by the certificate authority CA and may include the indication of the membership of the receiver node 100.5. The node authenticity related information of the receiver node 100.5 enables any other node to verify the authenticity of the receiver node 100.5.

In response to a successful authentication, the master node 100.1 generates a secret group key $K_{LID}5$ associated with the logical group LG 5. The master node 100.1 updates its key storage with the newly generated secret group key $K_{LID}5$.

In an operation S134, the secret group key $K_{LID}5$ is send by the request sender node 100.1 in a key update response to the request responding node 100.5. The key update response is send via a secure channel established between the request sender node 100.1 and the request responding node 100.5 on the shared bus such that the receiver node 100.5 is the only node, which is enabled to obtain the secret group key $K_{LID}5$ generated by the node 100.1.

The update key request respond comprises node authenticity related information of master node 100.1, which enables the receiver node 100.5 to authenticate receiver the master node 100.1. The may comprise a signature generated by the master node 100.1 using a paired private key. The signature is generated from a predefined sequence including among others the timestamp.

In response to a successful authentication of the master node 100.1 on the basis of the node authenticity related information comprised in the received update key response in an operation S126, the receiver node 100.5 is enabled to update its local key storage with the secret group key $K_{LID}5$ for future use. Hence, the node 100.1 and 100.5 are now in possession of the same secret group key $K_{LID}5$ associated with the logical group LG 5.

Those skilled in the art immediately understand that any further nodes, which are also member of at least one of the logical groups, of which master node 100.1 is member of, also send update key request responses to the master node 100.1. In response thereto, the secret group keys are updated at all nodes, which are member of at least one logical group, of which the master node 100.1 is member of. Herein, the nodes being member of the logical group LG 1 and/or the logical group LG 5 receive secret group key $K_{LID}1$ and/or the secret group key $K_{LID}5$, respectively. The secret group keys associated with the logical groups LG 1 and LG 5 are updated at all respective nodes connected to the shared bus. The master node 100.1 generates a logical group associated with a logical group once in each key update and distribution procedure.

In case the master node 100.1 receives form another receiver node a update key request response relating to a logical group, for which a secret group key has been already generated in the course of the current key update and distribution procedure, the master node 100.1 retrieves the respective secret group key from its local key storage for sending it back to the other receiver node.

All secret group keys, which are required by the master node 100.1 according to its membership of logical groups, are now updated. The master node functionality assumed by the master node 100.1 on receiving the trigger request is transferred to a next node connected to the shared bus. Each node, which receives a update key request, which comprises indication of membership, which does not match with its own membership or which only partially matches with its own membership, generates and broadcasts a update key request on the shared bus, which update key request corresponds to that described above with respect to the master node 100.1 but which comprises an indication of membership of the node having acquired the master node functionality.

For instance, node 100.2 has detected a partial match of the memberships. Node 100.2 acquires master node functionality in that it broadcasts in an operation S140 an update key request on the shared bus, which comprises the initiator authenticity related information and an indication of the membership of the master node 100.2 of one or more logical groups. For the sake of illustration, the master node 100.2 is member of the logical groups LG 1 and LG 2.

The nodes connected to the shared bus receive the update key request verify the authentication of the initiator node 200 and check whether they have at least a partially matching membership. The update key request is discarded/ignored by receiver node with matching membership in case the one or more secret group keys associated with the matching logical groups have already been updated in the course of the current key update and distribution procedure.

For instance node 100.1, which is member of the logical group LG 1 like the new master node 100.2, discards/ignores the update key request since the secret group key $K_{LID}1$ associated with the logical group LG 1 is already updated in the course of the current cascaded key update and distribution procedure.

Node 100.3, which is member of the logical group LG 2 like master node 100.2, responses to the update key request since the secret group key $K_{LID}2$ associated with the logical group LG 1 is not updated up to now in the course of the current cascaded key update and distribution procedure.

As aforementioned, the receiver node 100.3, which is member of the logical group LG 2 as the master node 100.2, sends in a following operation S150 an update key request response to the master mode 100.2 requesting to send an update of the secret group key $K_{LID}2$ associated with logical group LG 2. As described above, the update key request respond comprises node authenticity related information of the receiver node 100.3, which enables the master node 100.2 to authenticate the receiver node 100.3.

On receiving the update key request response, the master node 100.2 authenticates the receiver node 100.3, in an operation S152. The authentication verification includes authentication of the identity of the receiver node 100.3. In an example, the receiver node 100.2 authenticates itself by an identity certificate and the receiver node generated signature comprised by the node authenticity related information. The node authenticity related information of the receiver node 100.3 enables any other node to verify the authenticity of the receiver node 100.3.

In response to a successful authentication, the master node 100.2 generates the secret group key $K_{LID}2$ associated with the logical group LG 2. The node 100.2 updates its local key storage with the newly generated secret group key $K_{LID}2$.

In an operation S154, the secret group key $K_{LID}2$ is send by the master node 100.2 in a key update response to the receiver node 100.3. The key update response is send via a secure channel established between the master node 100.2 and the receiver node 100.3 on the shared bus such that only the receiver node 100.3 is able to obtain the secret group key $K_{LID}2$ generated by the master node 100.2.

The update key request respond comprises node authenticity related information of master node 100.2, which enables the receiver node 100.3 to authenticate receiver the master node 100.2. The node authenticity related information may comprise a signature generated by the master node 100.2 using a paired private key. The signature is generated from a predefined sequence including among others the timestamp.

In response to a successful authentication of the master node 100.2 on the basis of the node authenticity related information comprised in the received update key response in an operation S156, the receiver node 100.3 is enabled to update its local key storage with the secret group key $K_{LID}2$ for future use. Hence, the nodes 100.2 and 100.3 are now in possession of the same secret group key $K_{LID}2$ associated with the logical group LG 2.

The master node 100.2 has now updated all the secret group keys required according to its membership. The master node 100.2 transfers its master node functionality to a next node connected to the shared bus, for instance to node 100.3, which acquires master node functionality on broadcasting a update key request on the shared bus if a secret group key associated with a logical group, of which the node 100.3 is member, is not updated up to now.

From the above description, those skilled in the art understand that the secret group keys are kept confidential to any node, which are not member of the respective logical groups. The secret group keys are generated by one of the nodes and distributed via secure channels only to those nodes, which require the secret group keys according to their membership. Hence, a secret group key is only made known to those nodes, which are member of the respective logical group. Before generating and sending updates of secret group keys the nodes involved in the request-response communication mutually authenticate each other.

The master node functionality is transferred to next nodes until the respective secret group keys have been updated at nodes requiring them for data communication. The master node functionality is transferred to any one of the nodes, which receives an update key request response on a broadcast update key request, thereby a cascading of the key update and distribution procedure is obtained. The cascading ensured that all secret group keys are updated in the course of the key update and distribution procedure. Knowledge about the memberships of the nodes connected to the shared bus is not required by the initiator node 200 when initiating the key update and distribution procedure. The initiator node 200 is unable to acquire knowledge about the distributed secret group keys such that confidentiality of them is ensured.

Nodes, which are members of one or more groups, may be provisioned in advance with identity certificates and corresponding private keys to enables mutual authentication. Further, the nodes may be provisioned with a public key of the certificate authority, which has signed the identity certificates for verification purpose.

In the following, different aspect of the key update and distribution procedure will be discussed more fully with reference to various examples of the present disclosure. In the following, example implementations of the aforementioned key update and distribution procedure will be described with reference to a pseudo code notation, which is immediately understood by those skilled in the art in the context of the accompanying description.

Figure 3:
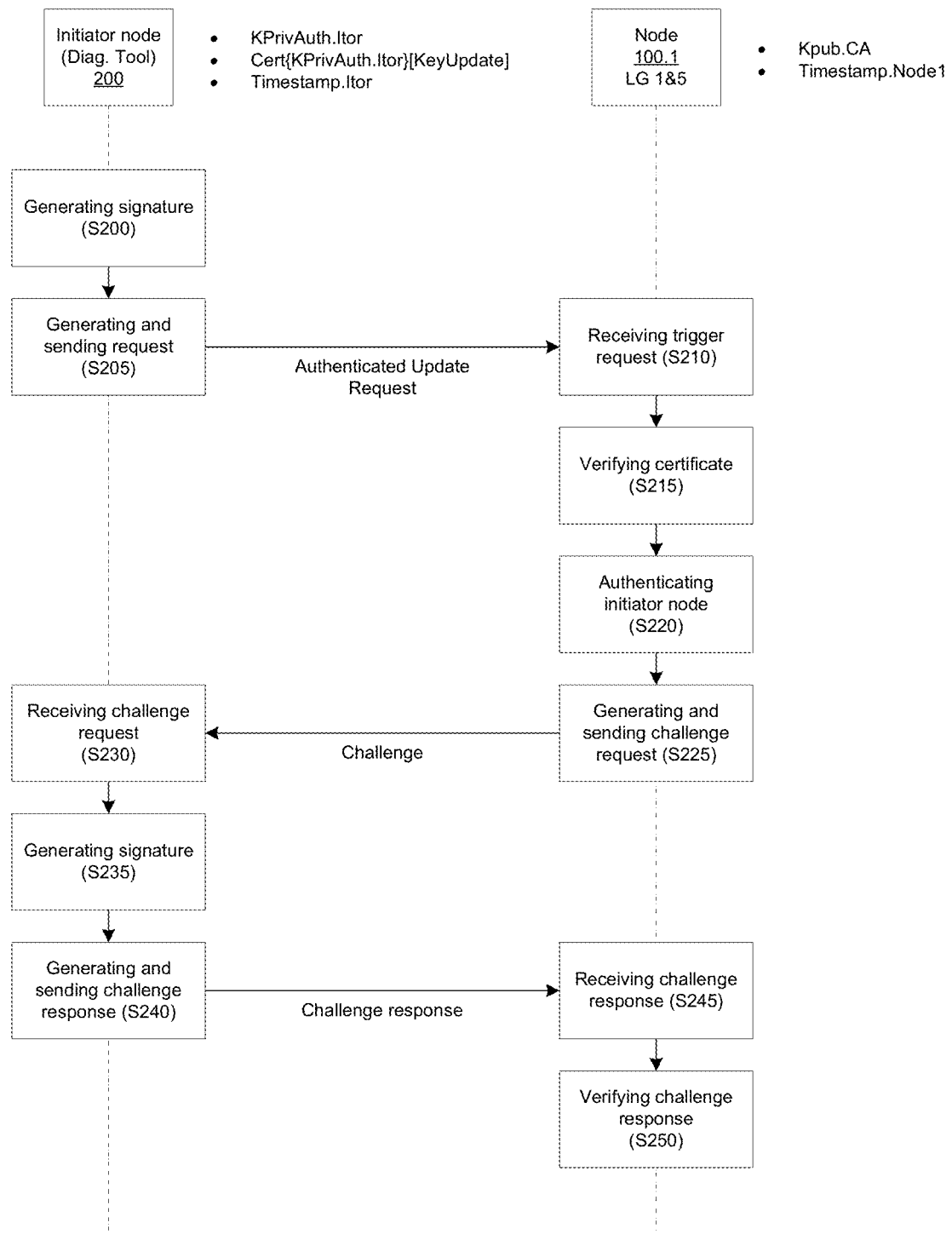
FIG. 3 schematically illustrates a flow diagram relating to the authentication and verification of the initiator node by a node connected to a shared bus according to an embodiment of the present application.

Referring now for FIG. 3, a flow diagram relating to the authentication and verification of the initiator node by the node connected to a shared bus according to an embodiment of the present application is schematically illustrated.

For enabling the authentication and permission verification of the initiator node 200 by for instance the master node 100.1, the trigger request includes the initiator authenticity related information, which comprises for instance a signature Si, which is generated in an operation S200 at the initiator node 200, and an identity certificate Cert{KPubAuth.Itor} [KeyUpdate] signed by the certification authority, CA. The identity certificate Cert{KPubAuth.Itor} [KeyUpdate] may comprise a usage definition, for instance for initiating the cascaded key update and distribution procedure.

The signature Si generated by the initiator node 200 is obtained by signing a predefined sequence using a private authentication key KPrivAuth.Itor. The predefined sequence may be formed of one or more sub-sequences. One of the sub-sequences may comprise a sequence with variable content, in particular a time-dependent variable content sequence such as a timestamp sequence Timestamp.Itor provided by the initiator node 200. It should be noted that a timestamp sequence represents a particular variable content sequence with a monotonic increasing content value. The sub-sequences include for instance an instruction/trigger sequence "KeyUpdateKeyDistributionRequest". The sub-sequences may further comprise a distinction sequence "0x00" (hexadecimal coded zero).

The signature is generated from a concatenation of one or more of the aforementioned sub-sequences; for instance, the predefined sequence is:

0x00||KeyUpdateKeyDistributionRequest[||Timestamp.Itor]

where || should be understood as a concatenation operator.

The signature Si is generated on the basis of a private key referred to as the private authentication key KPrivAuth.Itor of the initiator node 200:

Si←sign{KPrivAuth.Itor}
(0x00||KeyUpdateKeyDistributionRequest
[||Timestamp.Itor])

The trigger request comprises the signature Si and an identity certificate including the public key referred to as public authentication key KPubAuth.Itor of the initiator node 200. The private authentication key KPrivAuth.Itor and the public authentication key KPubAuth.Itor form a public-private key pair. The trigger request further comprises the variable content sequence such as the timestamp Timestamp.Itor in plain text. For instance:

Trigger_Request(Timestamp.Itor,Si,
Cert{KPubAuth.Itor}[KeyUpdate])

where Timestamp.Itor denotes the timestamp provided at the initiator node 200; Si denotes the generated signature and Cert{KPubAuth.Itor} [KeyUpdate] refers to the identity certificate provided at the node 200.

The trigger request generated at the initiator node 200 is send to one of the nodes connected to the shared bus, for instance to node 100.1, in an operation S205. On receiving the trigger request in an operation S210, the trigger request receiver node 100.1 becomes master node. The master node 100.1 is enabled by the trigger request to verify the identity and permission of the initiator node 200 in order to prevent from unauthorized access.

In an operation S215, the validity of the identity certificate Cert{KPubAuth.Itor} [KeyUpdate] is verified by the mater node 100.1 using the public CA key KPub.CA of the certificate issuing authority CA:

Verify{KPub.CA}(Cert{KPubAuth.Itor}[KeyUpdate])

The public CA key KPub.CA is available to the node 100.1. In an example, the public CA key KPub.CA is provisioned at the node 100.1. For instance, the public CA key KPub.CA is preconfigured at the node 100.1.

In case the identity certificate is successfully verified, the authenticity of the initiator node 200 is further verified based on the signature Si comprised in the trigger request an operation S220:

Verify{KPubAuth.Itor}(Si,
0x00||KeyUpdateKeyDistributionRequest[||Timestamp.Itor])

In case the authentication verification is successful, it is ensured that the received trigger request has been generated by the initiator node 200 being in possession of the private authentication key of the KPrivAuth.Itor.

In a further operation S220, the timestamp sequence Timestamp.Itor, which may be comprised in the trigger request, can be compared to a local timestamp Timestamp.ID1 of the master node 100.1. In case the timestamp sequence Timestamp.Itor is older (smaller) than the local timestamp Timestamp.ID1 of the master node 100.1, the procedure is aborted.

If Timestamp.Itor<Timestamp.ID1 then Abort( )

In case the timestamp Timestamp.Itor of the initiator node 200 is accepted, the local timestamp Timestamp.ID1 of the master node 100.1 may be updated with the timestamp Timestamp.Itor of the initiator node 200.

In an example, the aforementioned timestamp sequence may comprise a monotonic counter values, which may change in response to predefined events. For instance, at the time the vehicle is manufactured, the counter may be initialized to value 0 and increased in response to predefined events over the live time of the vehicle. In another example, the aforementioned timestamp may be comprise a time span value in predefined unit(s) determined from a reference time/date and the current time/date.

In case the timestamp Timestamp.Itor included in the trigger request is valid, the master node 100.1 may authenticate the initiator node 200 using a challenge-response authentication sequence.

For instance, the master node 100.1 generates a random number Cm,

Cm←random( )

and sends the a challenge request including the random number to the initiator node 200 in an operation S225:

Challenge_Request(Cm).

The initiator node 200 receiving the challenge request in an operation S230, generates a signature Sm by signing a predefined sequence comprising the received random number Cm using the private authentication key KPrivAuth.Itor in an operation S235. The predefined sequence may further comprise a sequence for purpose of distinction "0x01" (hexadecimal coded one), for instance:

Sm←sign{KPrivAuth.Itor}(0x01||Cm).

In an operation S240, the initiator node 200 sends the generated signature Sm in form of a challenge response to the master node 100.1:

Challenge_Reponse(Sm).

The signature Sm is verified by the node 100.1 in an operation S250 using the public authentication key KPubAuth.Itor of the initiator node 200 comprised in the previously received identity certificate Cert{KPubAuth.Itor} [KeyUpdate]:

Verify{KPubAuth.Itor}(Sm,0x01||Cm)

The initiator node 200 is authenticated by the successful verification.

Figure 4:
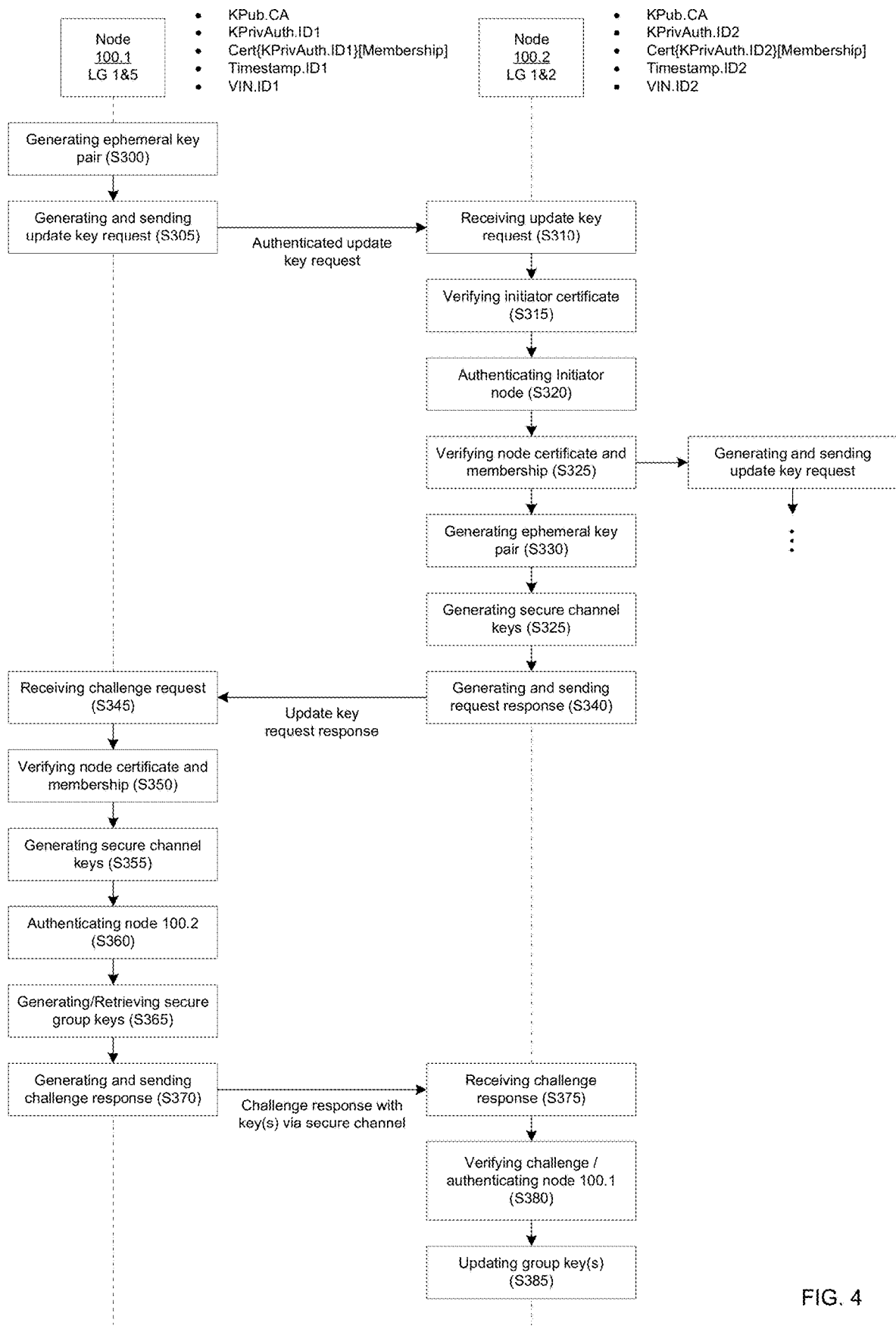
FIG. 4 schematically illustrates a flow diagram relating to a subsequence of the key update and distribution procedure performed by a master node and a receiver node according to an example of the present invention.

Referring now for FIG. 4, a flow diagram is schematically illustrated, which relates to a part of the key update and distribution procedure performed by a master node and a receiver node according to an embodiment of the present application. For the sake of illustration, the part of the key update and distribution procedure involving the master node 100.1 and receiver node 100.2 will be described in the following. Those skilled in the art will appreciate from the present disclosure that the described example applies likewise for operation and communication of all nodes participating in the key update and distribution procedure.

In an operation S300, an ephemeral key pair including an ephemeral private key DHKPriv.ID1 and an ephemeral public key DHKPub.ID1 is generated by master node 100.1:

GenerateDH(DHKPriv.ID1,DHKPub.ID1)

In an example, the ephemeral key pair is a Diffie-Hellman key pair. Those skilled in the art understand that the ephemeral key pair may be already generated in the course of the current key update and distribution procedure. The ephemeral key pair once generated by the node 100.1 may be used for request/response communication occurring in the course of the current key update and distribution procedure.

The master node 100.1 generates an update key request, which indicates its group membership. Herein, the master node is member of the logical group LG 1 and logical group LG 5.

The membership of the master node 100.1 is defined in an identity certificate Cert{KPubAuth.ID1} [Membership] signed by a certification authority, CA. The identity certificate Cert{KPubAuth.ID1} [Membership] comprise the membership definition of master node 100.1. The membership defines, of which logical groups the master node 100.1 is member. The identity certificate Cert{KPubAuth.ID1} [Membership] and a paired private authentication key KPrivAuth.ID1 are available to the master node 100.1. In an example, the identity certificate Cert{KPubAuth.ID1} [Membership] and the private authentication key KPubAuth.ID1 are provisioned at the master node 100.1. For instance, they are preconfigured at the master node 100.1.

The update key request comprises the ephemeral public key DHKpub.ID1 and the identity certificate Cert{KPubAuth.ID1} [Membership] of master node 100.1. The update key request may further comprise the aforementioned initiator authenticity related information.

Update_Key_Request(DHKpub.ID1,Timestamp.Itor,
Si,Cert{KPubAuth.Itor} [KeyUpdate],
Cert{KPubAuth.ID1}[Membership])

The initiator authenticity related information enables any receiver node to authenticate the initiator node 200 and further to verify the permission of the initiator node 200 to initiate the key update and distribution and even further to check the permission of master node 100.1 to send the current update key request.

In an operation S315, the validity of the identity certificate Cert{KPubAuth.Itor} [KeyUpdate] is verified by the receiver nodes using the public CA key KPub.CA:

Verify{KPub.CA}(Cert{KPubAuth.Itor}[KeyUpdate])

The public CA key KPub.CA is available to the receiver node 100.2. In an example, the public CA key KPub.CA is provisioned at the receiver node 100.2. For instance, the public CA key KPub.CA is preconfigured at the receiver node 100.2.

In case the identity certificate of the initiator is successfully verified, the authentication of the initiator node 200 is further verified based on the signature Si comprised in the update key request:

Verify{KPubAuth.Itor}(Si,
0x00||KeyUpdateKeyDistribution- Request-
||Timestamp.Itor)

In case the authentication verification is successful, it is ensured that the received update key request has been generated in response to a trigger request issued by initiator node 200, which is legitimate to issue such a trigger request. Hence, the receiver node 100.2 verifies by itself the authentication and the permission of the initiator node and the permission of the master node 100.1 to request key update.

In a further operation S320, the timestamp sequence Timestamp.Itor, which may be comprised in the update key request, is compared to a local timestamp of the receiver node 100.2. For instance, in case the timestamp sequence Timestamp.Itor is older (smaller) than the local timestamp Timestamp.ID2 of the receiver node 100.2, the procedure is aborted.

If Timestamp.Itor<Timestamp.ID2 then Abort( )

In case of a successful verification of the timestamp Timestamp.Itor, the local timestamp Timestamp.ID2 of the receiver node 100.2 is updated with the Timestamp.Itor received in the update key request.

In an operation S325, the identity certificate Cert{KPubAuth.ID1} [Membership] relating to the master node 100.1 is verified using the public CA key KPub.CA:

Verify{KPub.CA}(Cert{KPubAuth.ID1}[Membership])

In case the identity certificate is successfully verified, the membership of the master node 100.1 included in the identity certificate Cert{KPubAuth.ID1} [Membership] is compared to the membership of the receiver node 100.2. Herein, the membership of the master node 100.1 indicates that master node 100.1 is member of the logical groups LG 1 and LG 5, wherein the receiver node 100.2 is member of the logical groups LG 1 and LG 2. Accordingly, the memberships partially matches. Both, the master node 100.1 and the receiver node 100.2 are members of the logical group LG 1.

In response to the detection of matching membership of one or more logical groups, the receiver node 100.2 may generate in an operation S330 an ephemeral key pair comprising an ephemeral private key DHKPriv.ID2 and an ephemeral public key DHKPub.ID2. Those skilled in the art understand that the ephemeral key pair may be already generated in the course of the current key update and distribution procedure. The ephemeral key pair once generated by the node 100.2 may be used for request/response communication occurring in the course of the current key update and distribution procedure. In an example, the ephemeral key pair is a Diffie-Hellman key pair:

GenerateDH(DHKPriv.ID2,DHKPub.ID2)

In an operation S335, keys for setting up a secure channel are generated based on the ephemeral private key DHKPriv.ID2 of the receiver node 100.2 and the ephemeral public key DHKPub.ID1 of the master node 100.1. For instance, a shared secret Ks is first determined using the ephemeral private key DHKPriv.ID2 and the ephemeral public key DHKPub.ID1 in accordance with the Diffie-Hellman key exchange procedure:

Ks←DH(DHKPriv.ID2,DHKPub.ID1)

and an encryption key Ke and a message authentication key Km are derived by applying a key derivation function KDF( ) on the shared secret Ks:

(Ke,Km)←KDF(Ks,Constant)

Further a node authenticity related information based on signature Sb is generated by signing a predefined sequence using a private authentication key KPrivAuth.ID2 of the receiver node 100.2. The predefined sequence may be formed of one or more sub-sequences. One of the sub-sequences may comprise a sequence with variable content, in particular a time-dependent variable content sequence such as a timestamp sequence Timestamp.ID2 provided by the receiver node 100.2. In an example, the sub-sequences may comprise the public ephemeral keys DHKPub.ID2 and DHKPub.ID1 of the receiver node 100.2 and the master node 100.1. The predefined sub-sequences may further comprise the timestamp sequence Timestamp.ID2 provided at the receiver node 100.2:

Sb←Sign{KPrivAuth.ID2}
(DHKPub.ID2||DHKPub.ID1[||Timestamp.ID2])

A challenge Cb is generated by encrypting the signature Sb using the encryption key Ke.

Cb←Encrypt{Ke}(Sb)

In an operation S340, a update key request response is generated by the receiver node 100.2, which comprises the public ephemeral keys DHKPub.ID2 of the receiver node 100.2, an identity certificate Cert{KpubAuth.ID2} [Membership] of the receiver node 100.2 and the challenge Cb:

Update_Key_Request_Response(DHKPub.ID2,
Cert{KPubAuth.ID2}[Membership],Cb)

The identity certificate Cert{KpubAuth.ID2} [Membership] of the receiver node 100.2 is signed by the certification authority CA. The identity certificate Cert{KPubAuth.ID2} [Membership] comprise the membership definition of receiver node 100.2. The membership defines, of which logical groups the node 100.2 is member. The identity certificate Cert{KPubAuth.ID2} [Membership] and the private authentication key KprivAuth.ID2 corresponding to the public authentication key KPubAuth.ID2 comprised in the identity certificate of receiver node 100.2 are available to the receiver node 100.2. In an example, the identity certificate Cert{KPubAuth.ID2} [Membership] and the private authentication key KPubAuth.ID2 are provisioned at the receiver node 100.2. For instance, they are preconfigured at the receiver node 100.2.

The update key request response is send to the master node 100.1, at which it is received in an operation S345. The update key request response requests the updating of one or more secret group keys according to the membership matching.

In an operation S350, the identity certificate Cert{KPubAuth.ID2} [Membership] relating to the challenging node 100.2 is verified using the public CA key KPub.CA:

Verify{Kpub.CA}(Cert{KpubAuth.ID2}[Membership])

In case the identity certificate is successfully verified, the membership of the challenging node 100.2 included in the identity certificate Cert{KpubAuth.ID2} [Membership] is compared to the membership of the master node 100.1 to determine which secret group keys are requested by the challenging node 100.2. As aforementioned, the challenging node 100.2 requires the secret group key $K_{LID}1$ associated with the logical group LG 1 according to the partial match of the memberships. Both, the master node 100.1 and the receiver node 100.2 are members of the logical group LG 1.

In an operation S355, the shared secret Ks is first determined using the ephemeral private key DHKPriv.ID1 of the master node 100.1 and the ephemeral public key DHKPub.ID2 of the receiver node 100.2 for instance in accordance with the Diffie-Hellman key exchange procedure:

Ks←DH(DHKPriv.ID1,DHKPub.ID2)

and the encryption key Ke and the message authentication key Km are derived by applying a key derivation function KDF( ) on the shared secret Ks:

(Ke,Km)←KDF(Ks,Constant)

Further, a signature Sb is obtained by decrypting the encrypted challenge Cb using the encryption key Ke:

Sb←Decrypt{Ke}(Cb)

The signature Sb is verified in an operation S360 by using the public authorization key KpubAuth.ID2 comprised in the identity certificate Cert{KpubAuth.ID2} [Membership] of the receiver node 100.2:

Verify{KpubAuth.ID2}(Sb,
DHKPub.ID2∥DHKPub.ID1[∥Timestamp.ID1])

In case the authentication verification is successful, it is ensured that the update key request response has been generated by the receiver node 100.2 being in possession of the private authentication key of the KprivAuth.ID2.

In case the signature Sb is generated based on a sequence comprising the timestamp sequence Timestamp.ID2 provided at the receiver node 100.2, the authentication verification is only successful if the timestamp sequence Timestamp.ID1 provided at the master node 100.1, which corresponds to the timestamp sequence Timestamp.Itor used in the current key update and distribution procedure as defined by the initiator node 200 in the trigger request, corresponds to the timestamps Timestamp.ID2 provided at the receiver node Timestamp.ID1. In case of mismatch, the authentication verification is unsuccessful.

The procedure is aborted is case of an unsuccessful authentication verification: If Verify failed then Abort( )

In an operation S365, the one or more secure group keys $K_{LIDX}$, $K_{LIDY}$, . . . are generated in accordance with the membership matching. The one or more generated secure group keys $K_{LIDX}$, $K_{LIDY}$, . . . may be random keys:

Generate Keys($K_{LIDX}$,[$K_{LIDY}$[, . . . ]])

Each of the one or more generated secure group keys $K_{LIDX}$, $K_{LIDY}$, . . . is associated with a logical group LG x, LG y, . . . .

In an operation S370, the master node generates a challenge response including the one or more generated secure group keys $K_{LIDX}$, $K_{LIDY}$, . . . in encrypted form and a challenge Ca. The challenge Ca is based on a node authenticity related information, which is based on a signature Sa generated from a predefined sequence using the private authorization key KPrivAuth.ID1 of the mater node ID1. The predefined sequence may be formed of one or more sub-sequences. One of the sub-sequences may comprise a sequence with variable content, in particular a time-dependent variable content sequence such as a timestamp sequence Timestamp.ID1 provided by the master node 100.1. In an example, the predefined sub-sequences may comprise the public ephemeral keys DHKPub.ID1 and DHKPub.ID2 of the master node 100.1 and the receiver node 100.2. The predefined sub-sequences may further comprise the timestamp sequence Timestamp.ID1 provided at the master node 100.1:

Sa←Sign{KPrivAuth.ID1}
(DHKPub.ID1∥DHKPub.ID2∥Timestamp.ID1).

The challenge Ca is generated by encrypting the signature Sa using the encryption key Ke:

Ca←Encrypt{Ke}(Sa).

The one or more generated secure group keys $K_{LIDX}$, $K_{LIDY}$, . . . are further encrypted using the encryption key Ke and a key authentication code KeyMAC is generated by applying a message authentication function MAC( ) and the message authentication key Km on the encrypted secure group keys EncKeys( ):

EncKeys( )←Encrypt{Ke}($K_{LIDX}$,[$K_{LIDY}$[, . . . ]])

KeyMAC←MAC{Km}(EncKeys( ))

The challenge response comprises the challenge Ca, the encrypted secure group keys EncKeys( ) and the key authentication code KeyMAC:

Challenge_Response(Ca,EncKeys,KeyMAC)

The challenge response is send back to the receiver node 100.2, which receives is in an operation S375.

In an operation S380, the challenge Ca included in the received challenge response is verified. The verification of the challenge Ca includes decrypting the challenge Ca using the encryption key Ke to obtain the signature Sa:

Sa←Decrypt{Ke}(Ca)

and further verifying the signature Sa using the KPubAuth.ID1 of the master node 100.1. The public authorization key KPubAuth.ID1 has been received as part of the identity certificate Cert{KPubAuth.ID1} [Membership] comprised in the previous update key request.

Verify{KPubAuth.ID1}(Sa,
　　DHKPub.ID1∥DHKPub.ID2[∥Timestamp.ID2])

In case the authentication verification is successful, it is ensured that the received challenge response generated by the master node 100.1 in response to the key update request response.

Further in case the signature Sa is generated on the basis of a sequence comprising the timestamp sequence provided by the master node 100.1, the authentication verification implies a matching of the timestamp sequence Timestamp.ID1 with the local timestamp sequence Timestamp.ID2 provided at the receiver node 100.2. A successful authentication verification ensures that the timestamp sequences Timestamp.ID1 and Timestamp.ID2 of the master node 100.1 and the receiver node 100.2 match each other.

The procedure is aborted is case of an unsuccessful authentication verification:

If Verify failed then Abort( ).

Further, a key authentication verification code is generated by applying a message authentication function MAC( ) and the message authentication key Km on the encrypted secure group keys EncKeys( ) comprises in the challenge response and compared with the key authentication code KeyMAC comprises in the challenge response. In case the message authentication code generated by the receiver node 100.2 is not equal to the key authentication code KeyMAC procedure is aborted:

If KeyMAC #MAC{Km}(EncKeys)then Abort( ).

In an operation S385, the encrypted secure group keys EncKeys( ) are decrypted using the encryption key Ke to obtain the one or more generated secret group keys $K_{LIDX}$, $K_{LIDY}$, ... :

$K_{LIDX}[K_{LIDY}[, ... ]]$=Decrypt{Ke}(EncKeys( ))

and the local key storage of the receiver node 100.2 is updated with the one or more generated secret group keys $K_{LIDX}$, $K_{LIDY}$, ....

In a further example, the nodes, which are members of one or more groups, may be provisioned with an identification number. Such identification number may be unique for the bus system, which comprises the nodes connected to the shared bus. Such identification number may be unique for the device comprising the bus system. With reference to the aforementioned vehicle CAN bus example, the identification number may be the vehicle identification number VIN, which uniquely identifies a vehicle.

Each of the nodes may be provisioned with the identification number to ensure that only nodes intended for the system/device/vehicle are legitimately connected to the shared bus. In particular, provisioning the nodes with a unique identification number allows to prevent an illegitimate node such as a stolen node or counterfeit node from being updated with secrete group keys. The identification number may be preconfigured at the nodes.

The aforementioned node authenticity related information may comprise the identification number VIN.ID2 provisioned at the receiver node 100.2. For instance, node authenticity related information as described with reference to operation S335 is based on a signature Sb, which is generated from a sequence further comprising the identification number VIN.ID2:

Sb←Sign{KPrivAuth.ID2}
　　(DHKPub.ID2∥DHKPub.ID1[∥Timestamp.ID2]
　　∥VIN.ID2)

An authentication verification on the basis of the signature Sb is then successful only in case the identification number VIN.ID1 provisioned at the master node 100.1 matches the identification number VIN.ID2 provisioned at the receiver node 100.2 (cf. also operation S360 described above):

Verify{KPubAuth.ID2}(Sb,
　　DHKPub.ID2∥DHKPub.1D1∥[Timestamp.ID1]
　　∥VIN.ID1)

In case the identification number VIN.ID2 provisioned at the receiver node 100.2 and the identification number VIN.ID1 provisioned at the master node 100.1 mismatch, the authentication verification is unsuccessful. Hence, in case of mismatching identification numbers VIN.ID1 and VIN.ID2, the master node 100.1 is enabled to detect an illegitimate receiver node.

The procedure is aborted is case of an unsuccessful authentication verification:

If Verify failed then Abort( ).

Further, the sequence, on the basis of which the signature Sa is generated in operation S370 may also comprise an identification number, in particular the identification number VIN.ID1 provisioned at the master node 100.1:

Sa←Sign{KPrivAuth.ID1}
　　(DHKPub.ID1∥DHKPub.ID2∥[Timestamp.ID1]
　　∥VIN.ID1).

The including of the identification number VIN.ID1 into the predefined sequence for generating the signature Sa, allows the receiver node 100.2 to implicitly verify the identification number VIN.ID1 in operation S380, in which the signature Sa is verified by using the public authorization key KPubAuth.ID1 comprised in the identity certificate Cert{KPubAuth.ID1} [Membership] of the master node 100.1 and the identification number VIN.ID2 provisioned at the receiver node 100.2:

Verify{KPubAuth.ID1}(Sa,
　　DHKPub.ID1∥DHKPub.ID2[∥Timestamp.ID2]
　　∥VIN.ID2)

Hence, in case of mismatching identification numbers VIN.ID1 and VIN.ID2, the authentication verification fails:

If Verify failed then Abort( ).

From the above description, those skilled in the art that the master node 100.1 and the receiver node 100.2 are merely exemplary nodes. The described message exchange is likewise operated by other nodes participating in the key update and distribution procedure.

The above described key update and distribution procedure makes use of mutual authentication and signature verifications to establish an enhanced level of confidentiality regarding the shared secret group keys. The signature verifications further allow to introduce a system integrity verification based on the identification number. The reliability of the mutual authentication and signature verifications however relies on the security and protection of the private authentication keys KPrivAuth.ID of the nodes. In a typical use scenario, a tamper resistance of the private authentication keys KPrivAuth.ID provisioned at the nodes may not be guaranteed. In order to further raise the level of security, a secure element may be coupled to the shared bus. The secure element comprises a whitelist of identity certificates. On request by any node, the secure element response with a valid or invalid indication.

In some cases, secure element 150 may connect to shared bus via a network. Examples of such a network include any combination of control area networks (CAN), field buses, and local area networks (LAN). The network may include one or more gateway devices, switches, and the like, which enable computing devices to connect to different networks.

Figure 5:
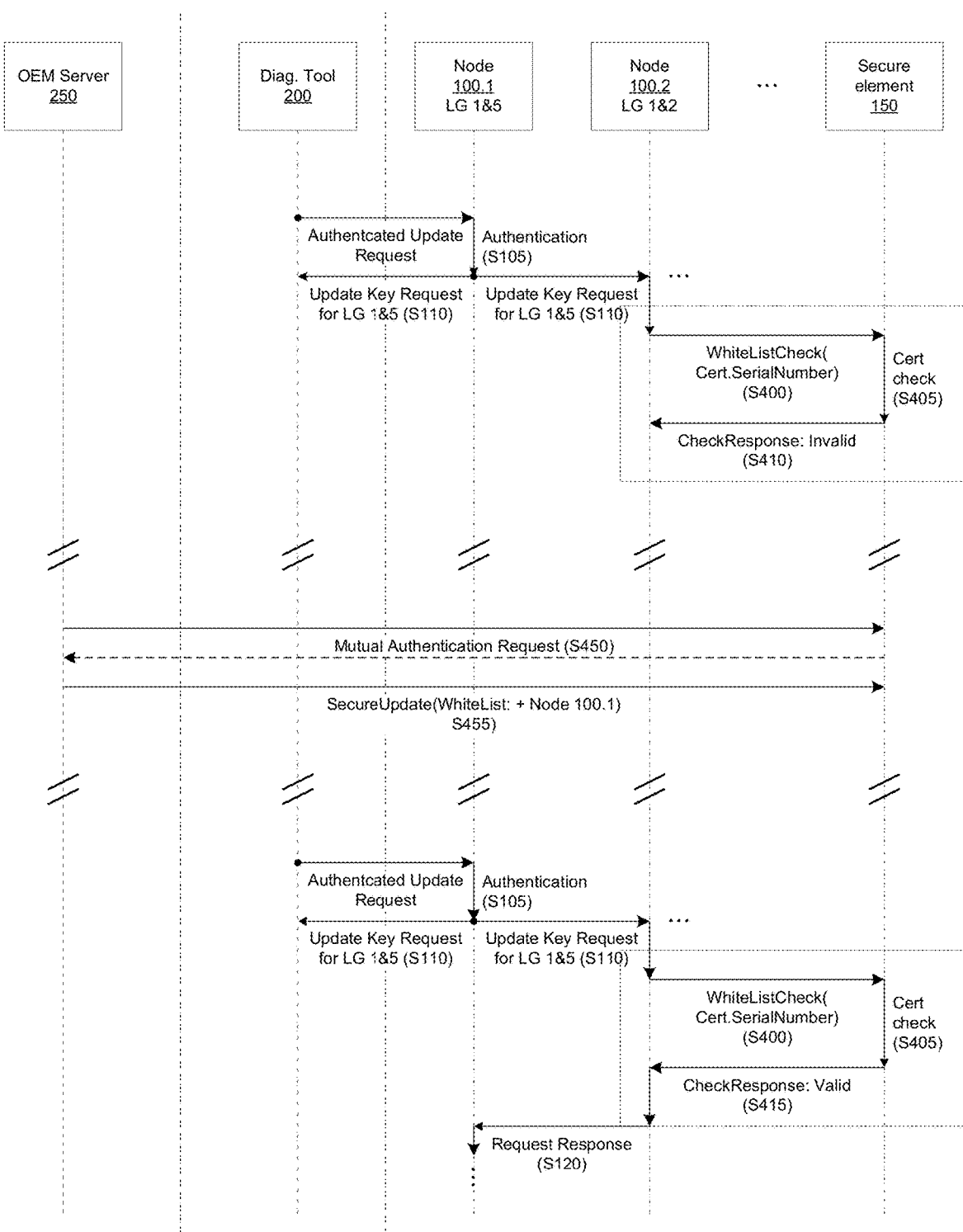
FIG. 5 schematically illustrates a flow diagram relating to a whitelist certificate validation according to an embodiment of the present application.

Referring now to FIG. 5, a flow diagram is schematically illustrated, which relates to a whitelist certificate validation according to an embodiment of the present application. The suggested whitelist certificate validation can be invoked by any node to check whether or not an identity certificate is listed in the whitelist maintained by the secure element 150. For instance, the receiver node 100.2 may invoke the check of the identity certificate Cert{KPubAuth.ID1} [Membership] included by the master node 100.1 into the update key request. The receiver node 100.2 generates a whitelist check request comprising for instance a serial number of the identity certificate Cert{KPubAuth.ID} [Membership] of the master node 100.1 and sends the whitelist check request to the secure element 150 in an operation S400. The secure element 150 maintains a whitelist comprising the serial numbers of all identity certificates, which are considered as valid. The whitelist comprises the serial numbers of all identity certificates of nodes, which are considered as legitimate nodes connected to the shared bus. In an operation S405, the secure element 150 matches the received serial number with the serial number comprised in the whitelist.

In case the serial number is not listed in the whitelist, the secure element 150 sends back a check response indicating that the serial number is invalid in an operation S410. In response to the indication of the invalidity of the identity certificate Cert{KPubAuth.ID1} [Membership] of the master node 100.1 the receiver node 100.2 aborts a current procedure.

In case the serial number is listed in the whitelist, the secure element 150 sends back a check response indicating that the serial number is valid in an operation S415. In response to the indication of the validity of the identity certificate Cert{KPubAuth.ID1} [Membership] of the master node 100.1 the receiver node 100.2 continues a current procedure.

The whitelist maintained at the secure element 150 may be configurable by a trusted entity such as an OEM server 250. To ensure the integrity and protection of the whitelist, an authentication of the OEM server 250 and the secure element 150 is required before the secure element accepts and update of the whitelist. The OEM server 250 may be mutually authenticated or a static authentication may be used to ensure that the update of the whitelist is legitimate. The static authentication may include static offline authentication. Such an update may comprise the serial number of an identity certificate of a node such as master node 100.1. An update of the whitelist may be required for enabling maintenance services and replacement of nodes.

Figure 6:
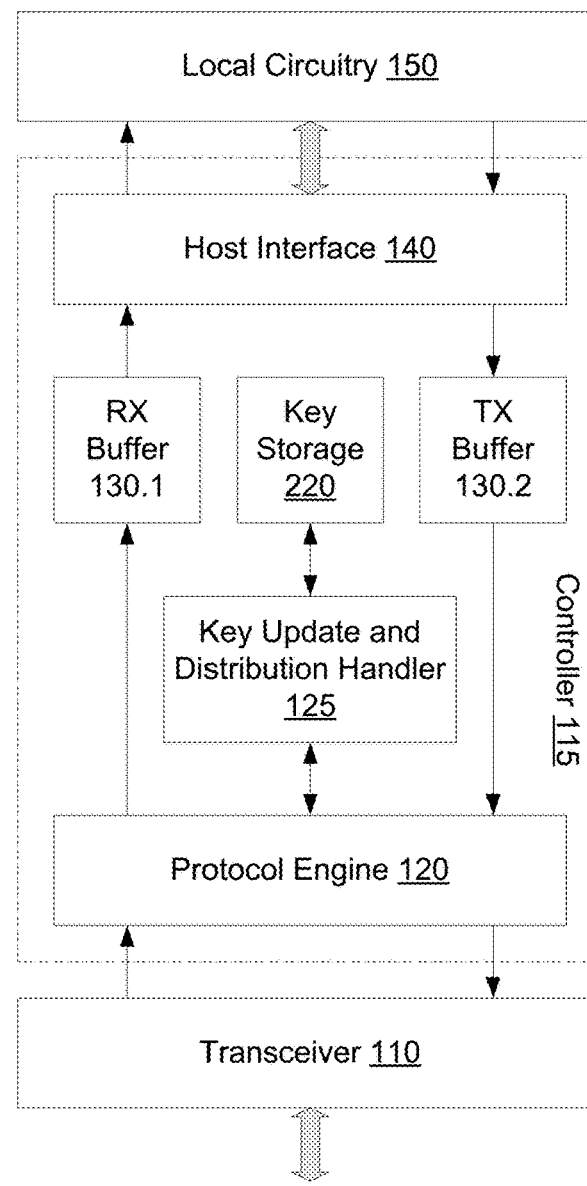
FIG. 6 schematically illustrates a block diagram of a node according to an embodiment of the present application.

As exemplarily illustrated in FIG. 6, the serial number of the identity certificate Cert{KPubAuth.ID1} [Membership] of the master node 100.1 is indicated as valid after the update of the whitelist, which adds the serial number of the identity certificate Cert{KPubAuth.ID1} [Membership] of the master node 100.1 to it.

In some cases, trusted entity such as an OEM server 250 may connect to secure element 150 via a network. Examples of such a network include any combination of control area networks (CAN), fieldbuses, local area networks (LAN), wide area networks (WAN), virtual private networks (VPN), wireless networks (using 802.11, for example), cloud networks, cellular networks (using 3G and/or LTE, for example), and the like. In some configurations, the network may include the Internet. Thus, the network may include one or more gateway devices, access points, routers, switches, dynamic host configuration protocol (DHCP) servers, and the like, which enable computing devices to connect to the Internet.

The check request generated by a node 100 may comprise a challenge Cb, which may be a random number, and the serial number of the identity certificate Cert{KPubAuth.ID} [Membership] of the node to be verified:

Cb←random( );

Check_Request(Cb,SerialNumberOf
 (Cert{KPubAuth.ID1}[Membership]))

The secure element 150 receiving the check request generates a signature Sb by signing a predefined sequence, which differs dependent on whether or not the received serial number is comprised in the whitelist.

In case the received serial number is found in the whitelist, the predefined sequence comprises the challenge Cb and the serial number. The predefined sequence is signed using a private authentication key KPrivAuth.SE of the secure element:

Sb←sign{KPrivAuth.SE}(Cb∥SerialNumber)

In case the received serial number is not found in the whitelist, the predefined sequence comprises the challenge Cb and the default error sequence such as "0x00". The predefined sequence is signed using a private authentication key KPrivAuth.SE of the secure element:

Sb←sign{KPrivAuth.SE}(Cb∥0x00)

The check request response send back by to the secure element 150 to the requesting node, e.g. node 100.2, comprises the signature Sb and an identity certificate Cert{KPubAuth.SE} [Whitelist] of the secure element 150.

Check_Request_Response(Sb,Cert{KPubAuth.SE}
 [Whitelist])

The identity certificate Cert{KPubAuth.SE} [Whitelist] and the private authentication key KPrivAuth.SE corresponding to the public authentication key KPubAuth.SE comprised in the identity certificate are available to the secure element 150. In an example, the identity certificate Cert{ KPubAuth.SE} [Whitelist] and the private authentication key KPrivAuth.SE are provisioned at the secure element 150. For instance, they are preconfigured at the secure element 150.

The node receiving the check request response may first verify the identity certificate Cert{KPubAuth.SE} [Whitelist] of the secure element 150 using the public CA key KPub.CA:

Verify{KPub.CA}(Cert{KPubAuth.SE}[Whitelist])

The verification of the signature Sb comprised in the check request response allows the node to detect whether or not the serial number of the certificate identify is enlisted in the whitelist of the secure element 150. The signature Sb is verified by using the public authentication key KPub-Auth.SE comprised in the identity certificate Cert{KPubAuth.SE} [Whitelist]:

$$\text{Verify}\{\text{KPubAuth.SE}\}(\text{Sb},\text{Cb}\|\text{SerialNumberOf}(\text{Cert}\{\text{KPubAuth.ID1}\}[\text{Membership}]))$$

If the verification is successful then the serial number is enlisted in the whitelist and the corresponding identity certificate Cert{KPubAuth.ID1} [Membership] is considered as valid. If the verification is unsuccessful then the serial number is not enlisted in the whitelist and the corresponding identity certificate Cert{KPubAuth.ID1} [Membership] is considered as invalid.

Referring now to FIG. 5, a block diagram a node according to an example of the present application is schematically illustrated. The node comprises for instance a bus controller, which is connected between a local circuitry 150 of the node and a transceiver 110, which connects to the shared medium of a distributed network such as a CAN bus or any other fieldbus. The local circuitry 150 may comprise a microprocessor. The network controller 115 comprises a protocol engine 120, RX and TX buffers 130.1, 130.2 and the host interface 140.

The protocol engine 120 may comprises a finite state machine, which is arranged to sequence through frames on a bit-by-bit basis, and change state for the various frame formats that are broadcasting or receiving. In particular, the protocol engine 120 is arranged to control the bit stream between transmit path and receive path in order to ensure that broadcasting, reception, arbitration, and error signaling are performed according to a network protocol.

Message data to be broadcast over the shared medium is loaded into the transmit TX buffer 130.2 via the host interface 140 by the local circuitry 150 of the node. The transmit TX buffer 130.2 may comprise several TX buffers for message data with different priorities levels. For instance, the transmit TX buffer 130.2 may comprise a primary transmit TX buffer for message date with high priority and a secondary transmit buffer for message data with low priority. The protocol engine 120 is for instance configured to compose a frame of prescribed format comprising the message data buffered in the transmit TX buffer 130.2 and to output the composed frame onto the shared medium via the transceiver 110. The protocol engine 120 is for instance arranged to output the composed message frame in a serial stream of logic signals to the transceiver 110.

Similarly, the protocol engine 120 is arranged to receive frames in form of a serial streams of logic signals via the transceiver 110 interfacing with the shared medium and is further arranged to decompose the received frames according to the frame formats. The data of a received frame provided to a receive RX buffer 130.1, from which it can be retrieved.

A key update and distribution handler 125 is for instance connected to the protocol engine 120 and a local key storage 220. The key update and distribution handler 125 is configured to perform perform the operation described above with reference to FIGS. 2 to 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of updating and distributing secret keys in a distributed network, wherein the network comprises a plurality of nodes connected to a shared medium of the distributed network, wherein each node of the plurality of nodes is member of at least one group of a plurality of groups, wherein each group is associated with a secret group key, wherein each node of the plurality of nodes stores only the one or more secret group keys, of which it is member, said method comprising:
a first node of the plurality of nodes, generating an authenticated update key request, wherein the authenticated update key request comprises an indication of a membership, of which the first node is member;
the first node, broadcasting the authenticated update key request on the shared medium of the distributed network;
each remaining nodes of the plurality of nodes, receiving the authenticated key update;
each remaining nodes, performing an authentication verification based on the authenticated key update request;
each remaining nodes, matching the respective memberships with the indication of a membership of the first node comprised in the authenticated key update request;
each remaining nodes, in case of at least a partial matching of memberships, generating an authenticated update key request response, which comprises an indication of the membership of the respective remaining node;
each remaining nodes, in case of a partial matching of memberships or a mismatch of the memberships, generating an authenticated update key request and broadcasting the authenticated update key request on the shared medium of the distributed network, wherein the authenticated update key request comprises an indication of a membership, of which the respective remaining node is member.

2. The method according to claim 1, further comprising:
the first node, receiving an authenticated key update request response from a second node, wherein the second node is one of the remaining node having detected at least a partial match of the memberships;
the first node, performing an authentication verification based on the authenticated key update request;
the first node, generating an authenticated key update response including one or more secret keys according to a matching of the membership of the first node and the membership of the second node; and
the first node sending the authenticated key update response to the second node via a secure channel.

3. The method according to claim 2, wherein the authenticated key update request response comprises node authenticity related information relating to the second node,
the method further comprising:
the first node, performing an authentication verification based on the node authenticity related information.

4. The method according to claim 2, wherein the secure channel is established in accordance with the Diffie-Hellman request-response procedure.

5. The method according to claim 2, further comprising: generating the one or more secret keys.

6. The method according to claim 2, wherein the authenticated update key response comprises node authenticity related information relating to the first node,
the method further comprising:
the second node, performing an authentication verification based on the node authenticity related information; and
the second node, updating a local key storage with the one or more secret keys comprised by the update key response.

7. The method according to claim 1, further comprising:
the first node, receiving a trigger request, which initiates a cascaded key update and distribution procedure;
wherein the first node is configured to generate the authenticated update key request in response to receiving the trigger request.

8. The method according to claim 1, wherein the trigger request is sent by an initiator node (200), wherein the trigger request is an authenticated trigger request, which comprises initiator authenticity related information,
the method further comprising:
the first node, performing an authentication verification based on the initiator authenticity related information.

9. The method according to claim 1, further comprising:
wherein the authenticated update key request comprises the initiator authenticity related information,
the method further comprising:
each remaining nodes, performing an authentication verification based on the initiator authenticity related information.

10. The method according to claim 1, wherein the indication of the membership is comprises in an identity certificate signed by a certificate authority, wherein each of the plurality of nodes is provisioned with a public key of the certificate authority and enabled to verify the identity certificate of any other node using the public key of the certificate authority.

11. The method according to claim 10, wherein the initiator authenticity related information comprises an identity certificate of the initiator node and a signature generated by the initiator node, wherein the signature is generated on the basis of a variable content, wherein the identity certificate of the initiator node is signed by the certificate authority.

12. The method according to claim 3, wherein the node authenticity related information comprises a signature, which is generated on the basis of an identification sequence, which is unique for all nodes the plurality of nodes.

13. The method according to claim 12, wherein the identification sequence is provisioned at all nodes.

\* \* \* \* \*